United States Patent [19]

Tikal et al.

[11] Patent Number: 4,826,368
[45] Date of Patent: May 2, 1989

[54] TWIST DRILL

[75] Inventors: Franz Tikal, Kirchseeon; Ulrich Krenzer, Fürth, both of Fed. Rep. of Germany

[73] Assignee: Hertel AG Werkzeuge & Hartstoffe, Fürth, Fed. Rep. of Germany

[21] Appl. No.: 59,648

[22] Filed: Jun. 8, 1987

[30] Foreign Application Priority Data

Jun. 7, 1986 [DE] Fed. Rep. of Germany ....... 3619245

[51] Int. Cl.$^4$ .............................................. B23B 51/02
[52] U.S. Cl. ...................................... 408/225; 51/288; 408/230
[58] Field of Search .................... 176/108 T; 408/227, 408/229, 230, 223, 224, 225; 51/288

[56] References Cited

U.S. PATENT DOCUMENTS

| | | | |
|---|---|---|---|
| 2,903,922 | 9/1959 | Ernst et al. | 408/230 |
| 3,067,548 | 12/1962 | Winslow | 51/288 |
| 3,656,264 | 4/1972 | Mackey, Jr. et al. | 51/288 |
| 4,602,900 | 7/1986 | Arpaio, Jr. et al. | 408/230 |

FOREIGN PATENT DOCUMENTS

| | | | |
|---|---|---|---|
| 21213 | 2/1982 | Japan | 408/227 |
| 48207 | 3/1985 | Japan | 408/230 |
| 197307 | 10/1985 | Japan | 408/230 |
| 582919 | 12/1977 | U.S.S.R. | 408/230 |

Primary Examiner—Gil Weidenfeld
Assistant Examiner—Daniel W. Howell
Attorney, Agent, or Firm—Spencer & Frank

[57] ABSTRACT

A twist drill having a longitudinal axis and major flanks ground by helical face grinding by means of a grinding wheel having a grinding face perpendicular to its axis of rotation and a circumferential profile, each major flank terminating in a cutting edge and having a surface which defines a clearance angle relative to the cutting edge wherein: the drill has an outer diameter and a central solid core having a thickness equal to 25% to 40% of the outer diameter; and each major flank is ground by a grinding operation performed by rotating the grinding wheel while its grinding face forms the major flank, effecting angular movement of the drill about its longitudinal axis and relative to the axis of rotation of the grinding wheel, effecting relative radial movement between the grinding wheel and the drill in the direction perpendicular to the drill axis and away from the axis of rotation of the grinding wheel, and effecting axial movement of the drill along its longitudinal axis toward the grinding wheel in a progressively increasing manner, such that the clearance angle defined by the finished major flank surface increases progressively with increasing distance from the cutting edge.

1 Claim, 9 Drawing Sheets

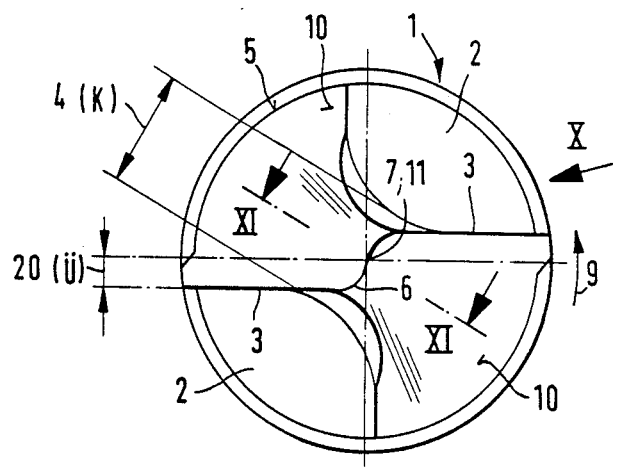
Fig. 6
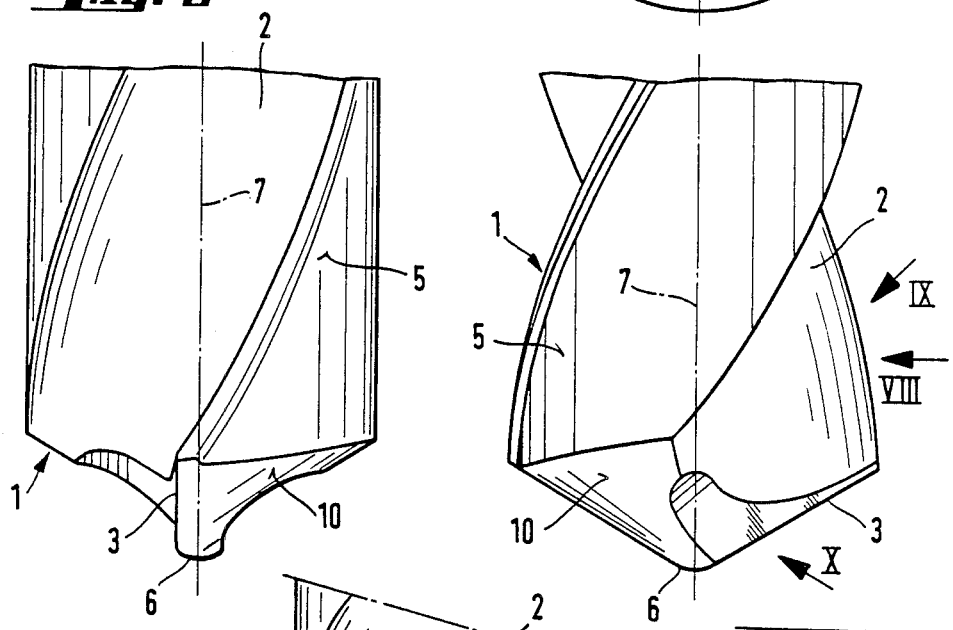
Fig. 8
Fig. 7
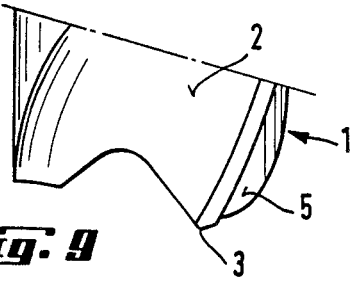
Fig. 9

($\varphi = 0°$)

$H_{R90} = \ddot{U} + S\ddot{U}$ ($\varphi = 90°$)

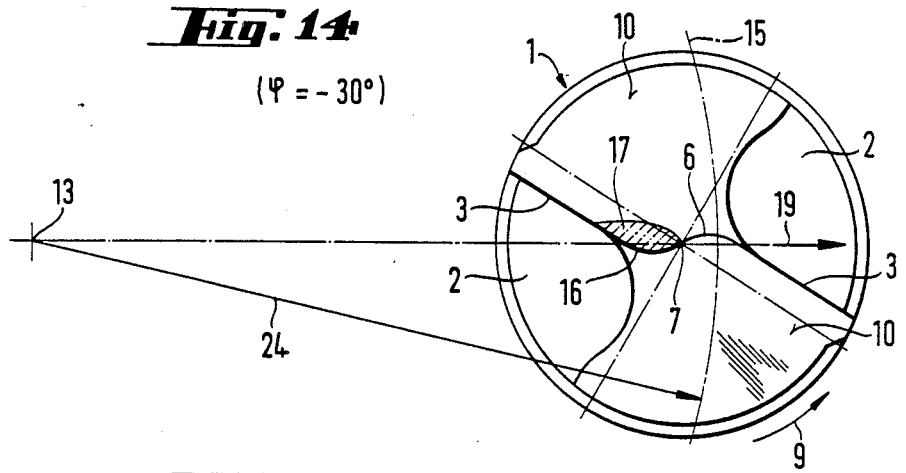
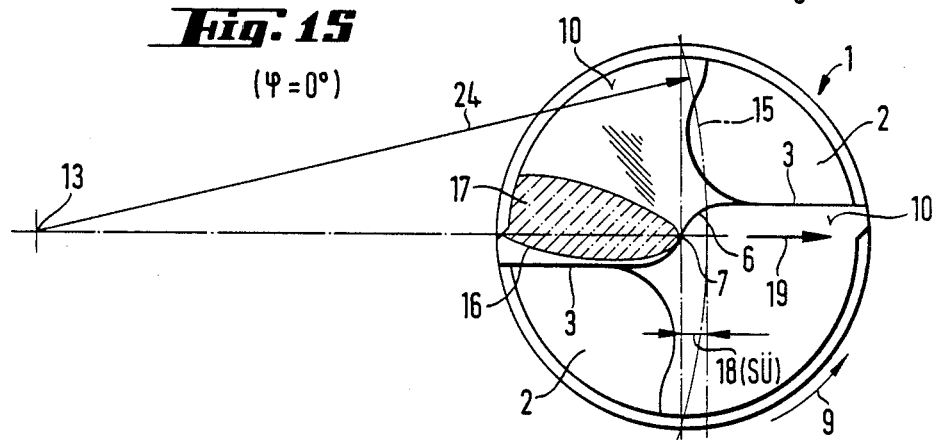
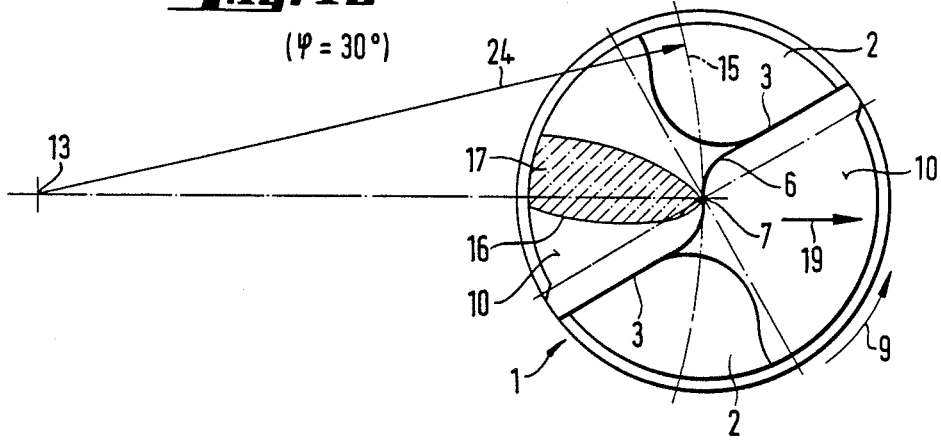

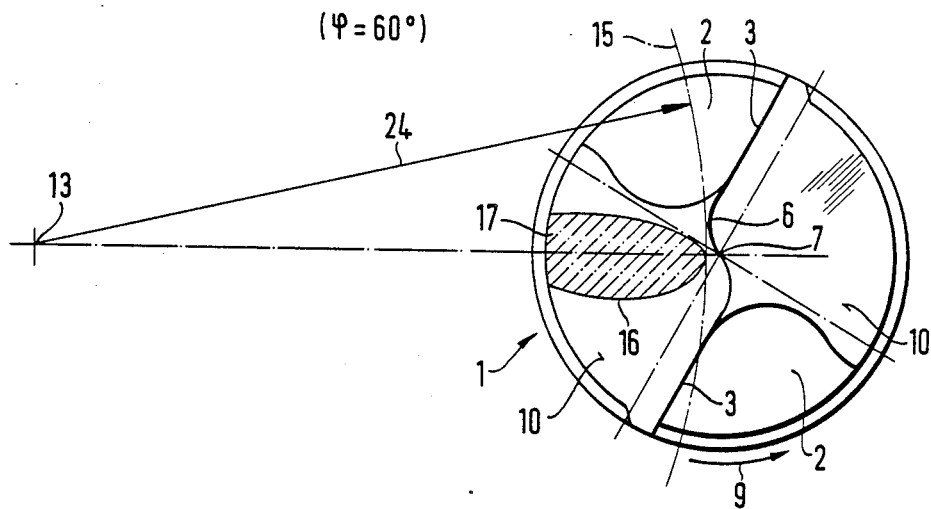
Fig. 17 (φ=60°)
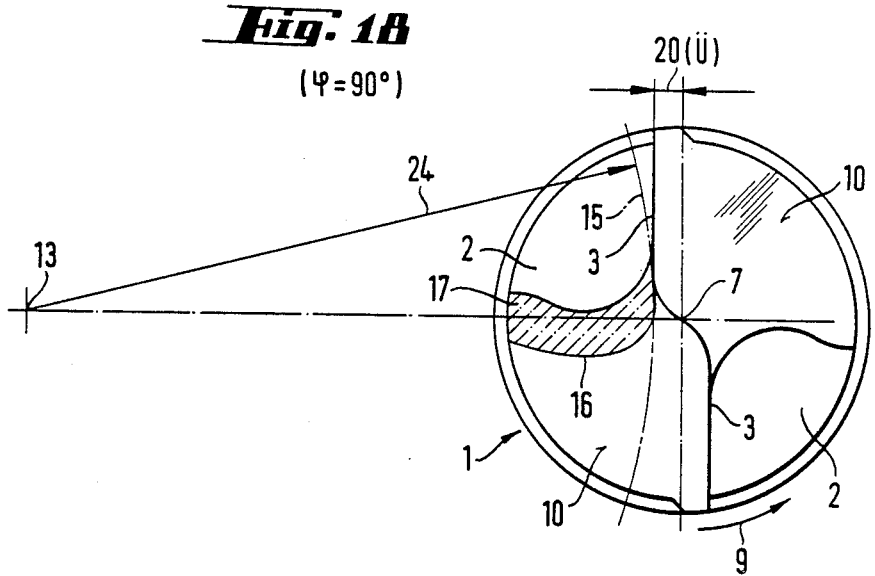
Fig. 18 (φ=90°)

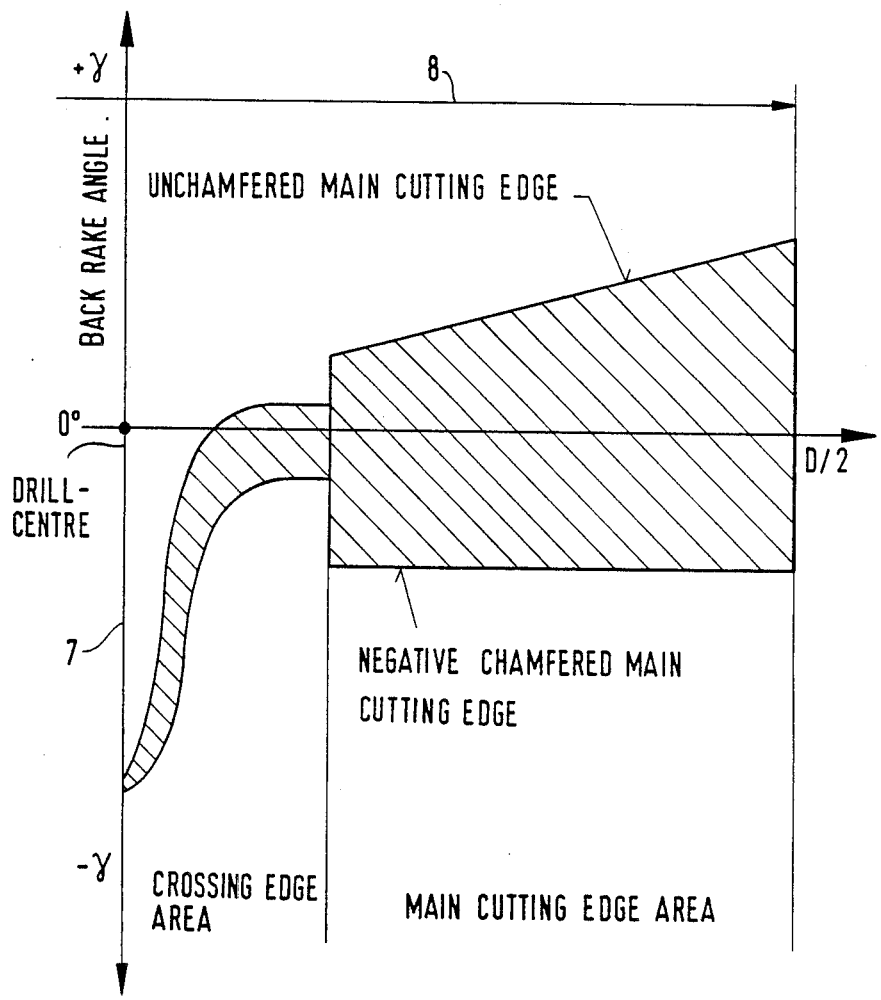
Fig. 19 VARIATION OF THE SE-DRILL BACK RAKE ANGLE, FROM THE CENTRE TO THE DRILLS OUTSIDE DIAMETER

TWIST DRILL

BACKGROUND OF THE INVENTION

The present invention relates to a twist drill, particularly a drill made entirely of hard metal and having major flanks ground in by a cut which produces helical faces. References herein to hard metal as the preferred material also include the use of a sintered or compound material, at least as the cutting material.

It is generally known that the helical grinding of a drill face in the vicinity of the chisel, or cutting, edge results in a greater clearance angle. This is favorable for easy, centered spot drilling but not favorable for high feed rates, particularly since it weakens the chisel edge. Thus, in order to improve cutting conditions in twist drills having helically ground faces corrections are often made at the chisel edge, e.g. by making it pointed or by adapting the side rake angle to the material to be drilled, as disclosed in Stock-Taschenbuch by R. Stock AG [Handbook published by the R. Stock AG], Berlin, 3rd Edition of 1979, at page 40.

SUMMARY OF THE INVENTION

It is an object of the invention to provide a twist drill of the above-mentioned type which will permit work at high feed rates while maintaining its easy, centered spot drilling characteristics and nevertheless ensuring a long service life.

The above and other objects are achieved, according to the invention by a twist drill having a longitudinal axis and major flanks ground by helical face grinding by means of a grinding wheel having a grinding face perpendicular to its axis of rotation and a circumferential profile, each major flank terminating in a cutting edge and having a surface which defines a clearance angle relative to the cutting edge, wherein:

the drill has an outer diameter and a central solid core having a thickness equal to 25% to 40% of the outer diameter; and each major flank is ground by a grinding operation performed by rotating the grinding wheel while its grinding face forms the major flank, and effecting angular movement of the drill about its longitudinal axis and relative to the axis of rotation of the grinding wheel, the grinding operation beginning with the grinding wheel at the location of the cutting edge and including:

effecting relative radial movement between the grinding wheel and the drill in the direction perpendicular to the drill axis and away from the axis of rotation of the grinding wheel from an initial position at which the drill axis is located radially inwardly of the circumferential profile of the grinding wheel at a distance from the circumferential profile that is 3% to 15% of the outer diameter of the drill to a final position at which the drill axis is located radially outwardly of the circumferential profile of the grinding wheel at a distance from the circumferential profile that is 7% to 14% of the outer diameter of the drill; and during the radial movement, effecting axial movement of the drill along its longitudinal axis toward the grinding wheel in a progressively increasing manner such that the clearance angle defined by the finished major flank surface increases progressively with increasing distance from the cutting edge.

The twist drill according to the invention has a core thickness which is far above average and which enhances its stability. However, this does extend the length of the chisel edge. Normally, this would lead one to expect worsening of the spot drilling and chip cutting properties, since the drill drags more than it cuts. However, this is not the case with the present invention.

Because of the almost steady transition of the chisel edge into the major cutting edge, stress peaks are avoided along the cutting edge.

By extending the chisel edge, and due to the manner of drill point grinding, chips cut by the drill are deformed immediately after they are created by being diverted in the region of the chisel edge and are tensioned to an extraordinary degree. When the chips enter the flutes they are additionally subjected to high torsion stresses which cause them to break into short pieces.

The characteristic of breaking into short pieces permits easy removal of the chips through the flutes. This characteristic of the twist drill is so extreme that even with a comparatively considerably increased chip cutting volume, the reduction of the inner flute cross sections caused by the enlarged core thickness does not have a disadvantageous effect. The characteristic of the twist drill to produce short chips even overcompensates for the reduction of the inner cross section of the flutes as a result of the increased core thickness. The twist drill is able to operate with a much greater feed than conventional twist drills.

The low toughness of the hard metal cutting material requires the largest possible lip angles for the cutting edges and for the chisel edges.

BRIEF DESCRIPTION OF THE DRAWING

The invention will now be described in greater detail for embodiments thereof which are illustrated in the drawings, as follows:

FIGS. 6 to 8 are views corresponding to FIGS. 1 to 3, respectively, of a further embodiment of a twist drill at which an additional correction has been made to the flute.

FIG. 9 is a side view of the drill point in the direction of the arrow IX of FIG. 7.

FIGS. 14 to 18 are frontal end views of the drill analogous to FIG. 1 in different angular drill positions between $\phi=-30°$ to $\phi=+90°$, giving the position of the outer profile of the grinding wheel, the generatrix of the flank of the major cutting edge, and the contact face between drill and grinding wheel in the individual rotary positions.

FIG. 19 is a diagram showing the size ranges covered by the invention for the respective axial rake angle of the major cutting edge plotted over the drill radius from the center of the drill to the outer diameter of the drill.

DESCRIPTION OF THE PREFERRED EMBODIMENTS

Figure 1:
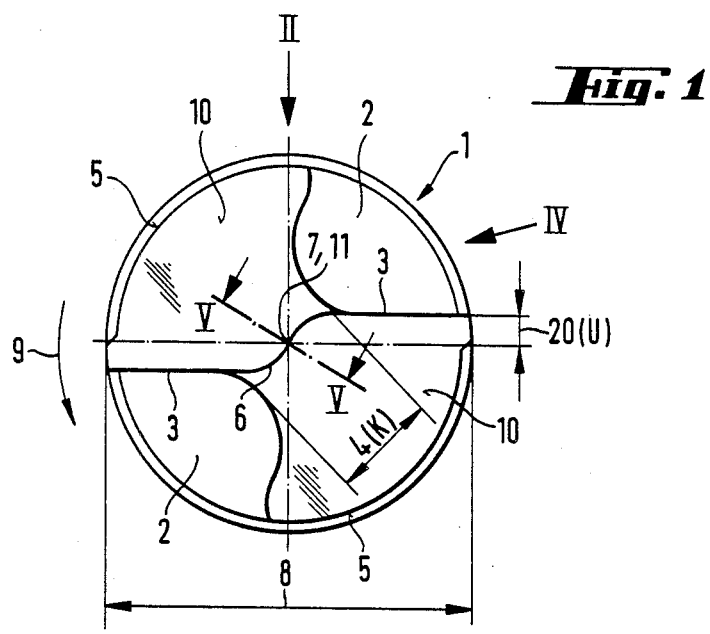
FIG. 1 is a frontal end view of a twist drill according to the invention.
Figure 2:
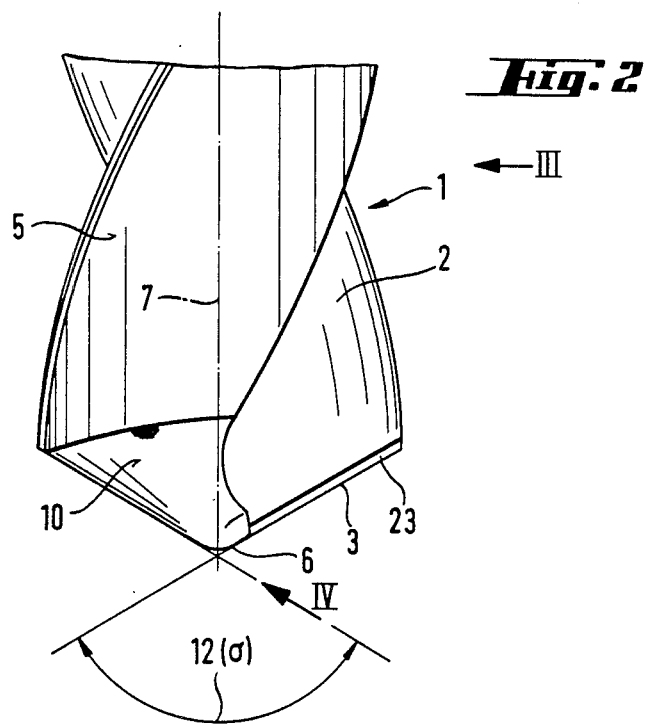
FIG. 2 is a side view of the cutting end of the drill seen in the direction of arrow II of FIG. 1.
Figure 4:
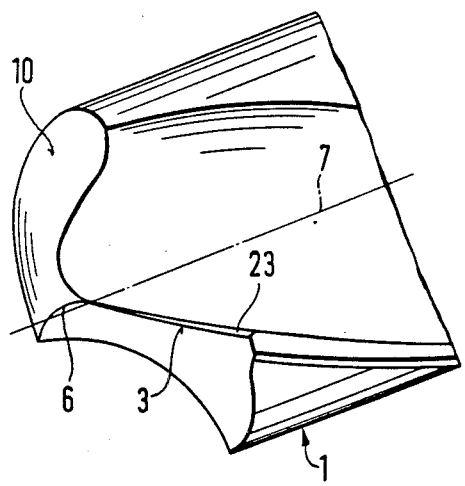
FIG. 4 is a side view of the drill point in the direction of arrows IV of FIGS. 1 and 2.
Figure 3:
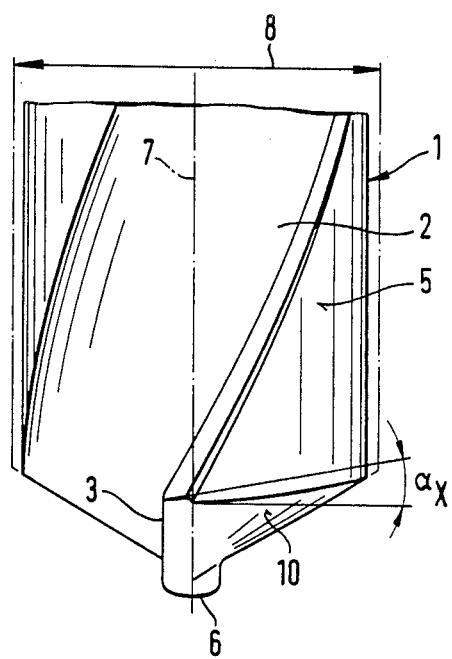
FIG. 3 is a side view in the direction of arrow III of FIG. 2.

The double cutting edge twist drill 1 shown in FIGS. 1–18 is provided with flutes 2 in the form of twisted grooves corresponding in number to the number of existing major cutting edges 3. The invention can also be employed similarly for twist drills having more than two major cutting edges and accordingly more than two flutes. Flutes 2 are worked into the drill body to a depth which determines the thickness K of core 4. Thus, the thickness of core 4 is the diameter of a circle tangent to the bottoms of flutes 2. In the region of drill core 4, major cutting edges 3 are connected with one another by chisel edges 6 or, more precisely, each cutting edge 3 merges into a chisel edge 6.

In the drill according to the invention, the core thickness K amounts to 25% to 40% of the drill external diameter 8. The cutting direction of the drill is indicated by an arrow 9 in FIGS. 1 and 6. The frontal faces of the drill, i.e. the faces lying between major cutting edges 3 and circumferential faces 5, form the major flanks 10. Chisel edges 6 meet at the drill point 11 and, the point angle 12 has a value c while the lip angle 25, (FIGS. 5 and 11) in the drill axis 7 has the value $\beta_z$.

Figure 12:
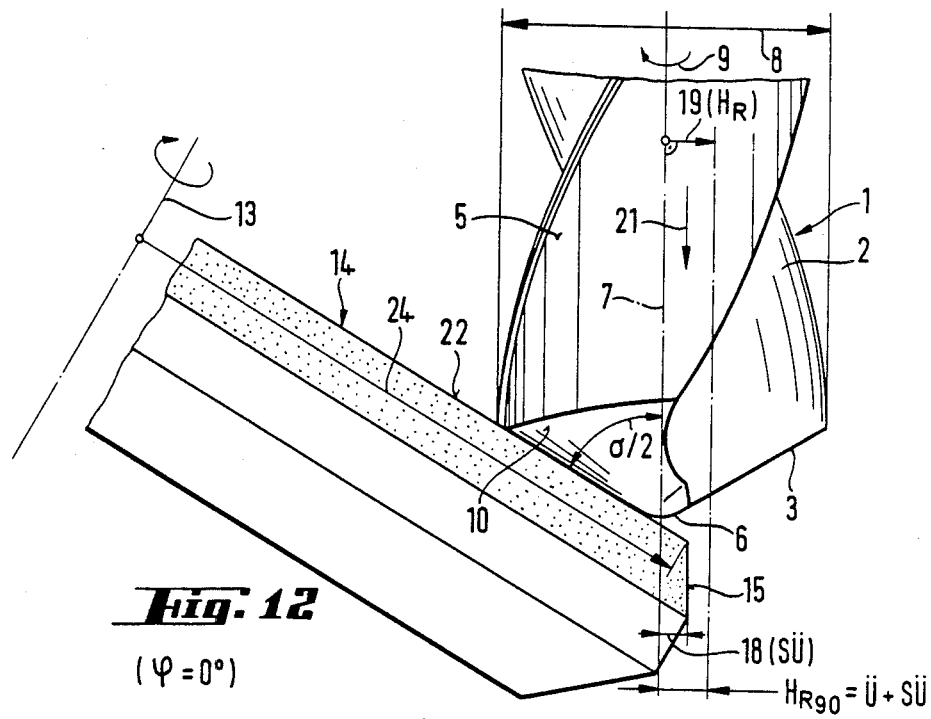
FIG. 12 is a side view of the drill point corresponding to FIG. 2, during drill point grinding with the grinding wheel in the angular position at $\phi=0°$ at the start of grinding.
Figure 13:
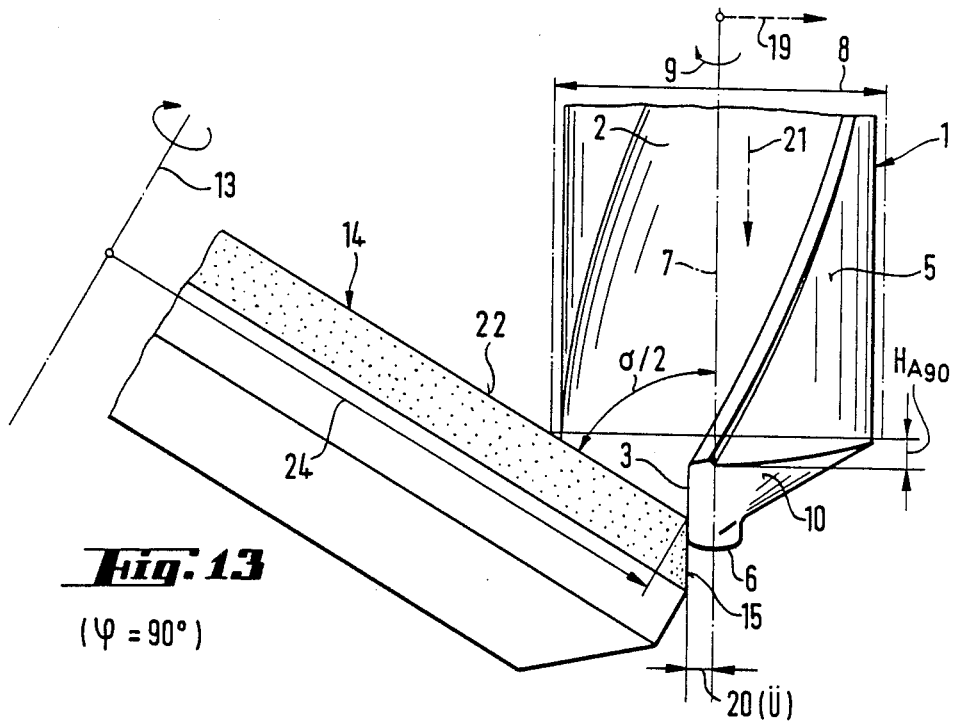
FIG. 13 s a side view of the drill point corresponding to FIG. 3 during drill point grinding with the grinding wheel in the angular position of $\phi=90°$ in grinding engagement (at the end of the drill point grinding process).

For the embodiment of FIGS. 1–5, the drill point grinding process for the drill is effected by means of a face grinding wheel 14, shown in FIGS. 12 and 13, which rotates about a stationary axis 13. Several relative positions between drill 1 and grinding wheel 14 during the grinding process are shown in FIGS. 12 to 18. FIG. 12 here shows the drill with grinding wheel 14 in a stationary mount and in drill 1 in an angular position $\phi = 0°$, in which essentially a major cutting edge 3 is ground. FIG. 13 shows drill 1 in its relative end position in which drill 1 has been displaced translatorily in the direction 19 of radial feed $H_R$ with respect to grinding wheel 14 and has been rotated by 90° in its cutting direction 9. Thus, in FIG. 13, the drill is in an angular position with $\phi = 90°$ —always with respect to drill axis 7. The rotary position at $\phi = 90°$ is an end position of the drill during grinding of one major cutting edge 3.

FIGS. 14 to 18 show—starting with the first, still slight, engagement of grinding wheel 14 at the beginning of drill point grinding, with drill 1 in an angular position at $\phi = -30°$ (FIG. 14). The various angular positions of drill 1 follow one another in cutting direction 9, going through position angles $\phi = 0°$, 30° and 60° to end in angular position $\phi = 90°$ (FIG. 18). As drill 1 rotates, at a selected speed, from $\phi = -30°$ to $\phi = +90°$, drill 1 is displaced radially and translatorily in direction 19 with respect to grinding wheel 14. This radial feed $H_R$ of drill 1 is evident in FIGS. 14 t 18 by the changed relative position of the circumferential profile 15 of grinding wheel 14 with respect to drill axis 7. In the illustrated angular positions of drill 1, the generatrix 16 of wheel 14 is shown in each case as well as, in hatching, the contact surface 17 of grinding wheel 14.

In rotary position $\phi = 0°$ (FIG. 15), generatrix 16 and the circumferential profile 15 of grinding wheel 14 extend beyond the drill axis 7, with the degree of projection 18 (SÜ) or, in other words, the position beyond the center, being 3% to 15% of drill diameter 8. Smaller values apply for work with softer materials, higher values for use of drill 1 for working harder materials where the drill must have greater stability.

With continuing drill point grinding and continuing rotation of drill 1 beyond rotary position $\phi = 0°$ in cutting direction 9, generatrix 16 is moved radially out of the beyond-the-center position, shown in FIGS. 12 and 15, and advances in the direction 19 of radial feed $H_R$ of drill 1. In the illustrated embodiment this is done by effecting a translatory movement of drill axis 7 at a right angle to its longitudinal direction. At the end of drill point grinding (rotary position angle $\phi = 90°$; FIGS. 13, 18), generatrix 16 and circumferential profile 15 of grinding wheel 14 have a position 20 (Ü) in front of axis 7, which amounts to 7% to 14% of drill diameter 8. The lower value of 7% here applies for a drill of large diameter 8 for working soft material to be worked, while the higher value of 14% is applicable for a drill of smaller diameter 8 for working hard material. The distance Ü also represents the distance between cutting edge 3 and a line parallel thereto and passing through axis 7, as shown in FIG. 6.

Figure 20:
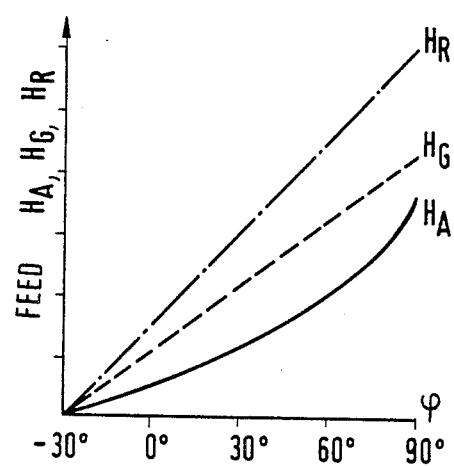
FIG. 20 is a diagram for the drill point grinding process shown in FIGS. 14 to 18, which gives a qualitative representation of the magnitudes of the radial feed $H_R$ and the components $H_G$ and $H_A$ of the axial feed of the drill as a function of the angular position of the drill between start of drill point grinding at $\phi = -30°$ and the end of drill point grinding at $\phi = +90°$.
Figure 21:
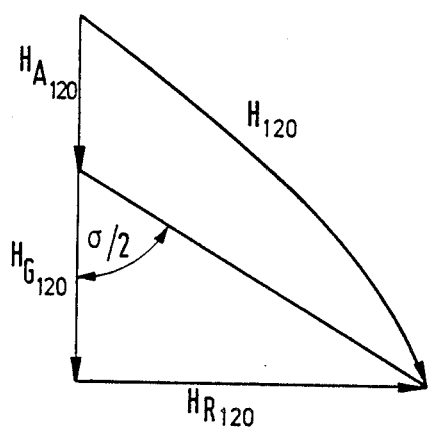
FIG. 21 is a vector diagram of the feed vectors during the grinding process.

During drill point grinding, drill 1 is also advanced axially relative to grinding wheel 14 in the direction of arrow 21 (FIGS. 12 and 13). This axial advance is composed of a basic feed $H_G$ which occurs proportionately to radial feed $H_R$ (direction of arrow 19). This basic feed $H_G$ ensures that drill 1 always remains in contact with the surface 22 of grinding wheel 14. The component of basic feed $H_G$ in the axial advance (arrow 21) thus constitutes merely a compensation of the radial feed $H_R$ without by itself already initiating the flank grinding process or determining the clearance angle. The latter is done by additional axial feed component $H_A$ which increases progressively with changes in the angular positions $\phi$ of drill 1 until the end position of drill point grinding at $\phi = 90°$ is reached. The relation between $H_R$, $H_G$ and $H_A$ is shown in the diagrams of FIGS. 20 and 21. The increase in component $H_A$ preferably corresponds to an exponential function. FIG. 21 shows the vector for each feed over a drill rotation angle of 120° ($\phi = -30°$ to 90°), together with resultant vector H.

Thus, starting with drill point grinding of the major cutting edge 3, the resulting axial feed of the generatrix 16 which is effective in the direction of arrow 21 over the entire drill point grinding range, becomes so progressive that the face clearance angle of major cutting edge 3 increases with increasing advance of the rotation angle φ and with increasing distance from major cutting edge 3.

Figure 22:
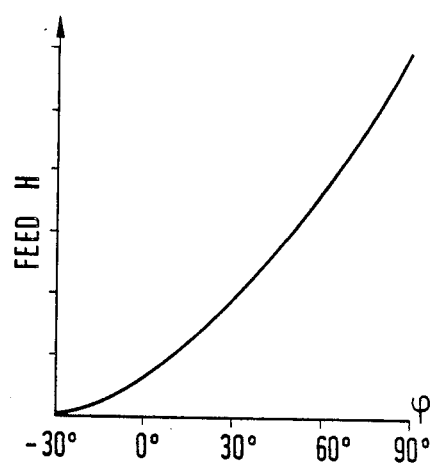
FIG. 22 is a diagram for the drill point grinding process of FIGS. 14 to 18, showing the curve of the resulting total feed H as a function of the rotary position of the drill between the start of drill point grinding $\phi = -30°$ and the end of drill point grinding at $\phi = +90°$.
Figure 23:
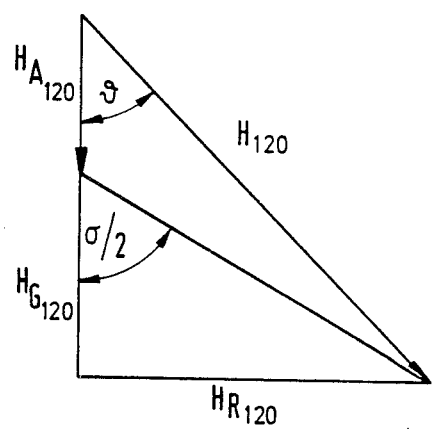
FIG. 23 is a modified vector diagram of the feed vectors during the grinding process.

The curve of the radial feed $H_R$ which is active in the direction of arrow 19 with successive angular positions φ of drill 1 may selectively be linear, as shown in FIGS. 20 and 21, or may vary progressively, as shown in FIGS. 22 and 23. If it is made according to FIGS. 22 and 23, the feed axis required in the grinding machine for the embodiment according to FIGS. 20 and 21 can be omitted.

Individual Examples 1 to 3 are listed below. They show that for a drill diameter of 8.3 mm, a side clearance angle $α_x$ of 6° is sufficient to operate the drill at feed rates of 0.34 mm per revolution. In contrast thereto, for drills having tapered drill points according to the present-day state of the art, side clearance angles $α_x$ of 10° are recommended for a corresponding drill diameter, with these clearance angles permitting feed rates of about 0.12 to 0.16 mm per revolution.

Depending on the material to be worked, major cutting edge 3 may be provided with a protective margin 23 or may be reinforced by rounded edges. The protective margin then merges almost steadily into chisel edge 6.

Figure 5:
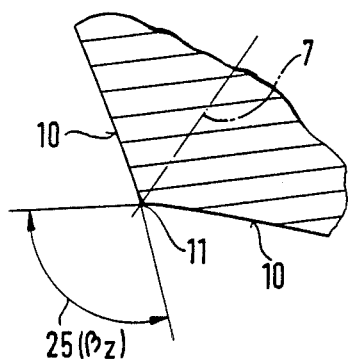
FIG. 5 is a partial cross-sectional view of the drill point seen along line V—V of FIG. 1.
Figure 10:
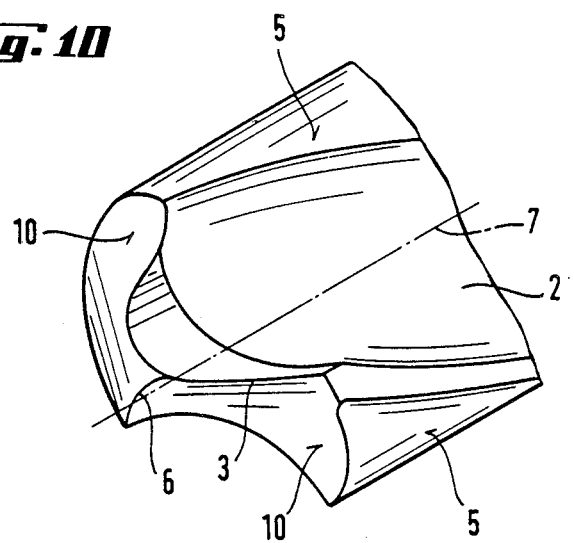
FIG. 10 is a side view of the drill point in the direction of arrows X in FIGS. 6 and 7.
Figure 11:
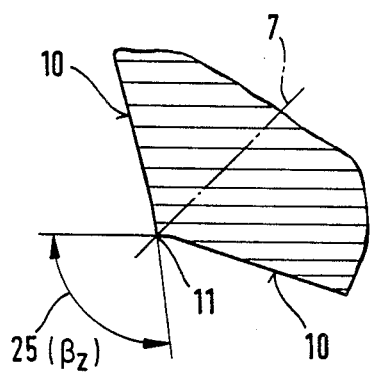
FIG. 11 is a partial sectional view through the drill point along section line XI—XI of FIG. 6.

In the twist drill according to the invention, the lip angle shown in FIGS. 5 and 11, in the region of drill point 11 has a value $β_z$ of about 60° to 120°.

This stable lip angle 25 allows for the handling of high feed forces, or pressure forces, with sufficiently good centering properties.

The magnitude $β_z$ of the lip angle is defined by the magnitude c of point angle 12, the grinding wheel radius 24 and particularly the degree of projection 18.

The negative rake angle 8 in the center ($=0.5 \times β_z$) as a result of the lip angle 25, steadily decreases, starting from the center of the drill, toward its exterior and, where it changes to the major cutting edge, it amounts to about −20° to +10°, in particular 0°, as indicated in FIG. 19.

For a twist drill it is of particular advantage to have an extremely small side clearance angle $α_x$ of, for example, only 6° (see Examples 1 and 2).

The axial pitch of flanks 10 is progressive with increasing distance from cutting edges 3. Thus, with relatively small clearance angles, and therefore stable lip angles, the greatest possible chip area is produced between chisel edges 6 and flanks 10. This permits unimpeded flow of the chips away from chisel edges 6.

In the embodiment of FIGS. 6–11, flutes 2 are provided with an additional recessed portion in the vicinity of flanks 10.

EXAMPLE 1

Solid hard metal drill, diameter 13.5 [mm] hard metal quality P40 (coated)

σ=140°
$α_x$=6°
Ü=1.25 mm
SÜ=0.7 mm
θ=46°=constant
$H_{90}$=3.0 mm

During use, the following cutting data were realized:

| test material | Ck 45 |
| --- | --- |
| rate of rotation | n = 2850 min$^{-1}$ |
| cutting velocity | Vc = 120 m/min |
| feed per revolution | f = 0.6 mm |
| feed per minute | vf = 1710 mm/min |
| drilling depth | Lf = 25 mm |
| shape of chips | short crumbly chips |

EXAMPLE 2

Solid hard metal drill, diameter 8.3 [mm] hard metal quality P40 (coated)

σ=140°
$α_x$=6°
Ü=0.85 mm
SÜ=0.42 mm
θ=43°=constant
$H_{90}$=1.91 mm

During use, the following cutting data were realized:

| test material | C 35 |
| --- | --- |
| rate of rotation | n = 3200 min$^{-1}$ |
| cutting velocity | Vc = 83 m/min |
| feed per revolution | f = 0.3 mm |
| feed per minute | vf = 1100 mm/min |
| drilling depth | Lf = 18 mm |
| tool life realized | L = 12.7 m |
| shape of chips | short crumbly chips |

EXAMPLE 3

| Drill | Vc (m/min) | f (mm/r) |
| --- | --- | --- |
| HSS drill | 20–30 | 0.12–0.2 |
| HSS drill, TIN coated | 25–30 | 0.2–0.3 |
| VHM drill, 3 cutting edges conventional | 80–100 | 0.12–0.2 |
| present invention | 80–100 | 0.5 | material employed 50CrV4
strength 800 N/mm$^2$
drill diameter 10.5 mm

The invention now being fully described, it will be apparent to one of ordinary skill in the art that many changes and modifications can be made thereto without departing from the spirit or scope of the invention as set forth herein.

What is claimed:

1. A twist drill having a longitudinal axis and major flanks ground by helical face grinding by means of a grinding wheel having a grinding face perpendicular to its axis of rotation and a circumferential profile, each major flank terminating in a cutting edge and having a surface which defines a clearance angle relative to the cutting edge, wherein:

said drill has an outer diameter and a central solid core having a thickness equal to 25% to 40% of the outer diameter, said drill having at least two major flanks and having a point angle, defined by the cutting edges of the two major flanks, of at least 130°; and each said major flank is ground by a grinding operation performed by rotating the grinding wheel while its grinding face forms the major flank, and effecting angular movement of the drill about its longitudinal axis and relative to the axis of rotations of the grinding wheel, the grinding operation beginning with the grinding wheel at the location of the cutting edge and including:

effecting relative radial movement between the grinding wheel and the drill in the direction perpendicular to the drill axis and away from the axis of rotation of the grinding wheel from an initial position at which the drill axis is located radially inwardly of the circumferential profile of the grinding wheel at a distance from the circumference profile that is 3% to 15% of the outer diameter of the drill to a final position at which the drill axis is located radially outwardly of the circumferential profile of the grinding wheel at a distance from the circumferential profile that is 7% to 14% of the outer diameter of the drill; and during the radial movement, effecting axial movement of the drill along its longitudinal axis toward the grinding wheel in a progressively increasing manner such that the clearance angle defined by the finished major flank surface increases progressively with increasing distance from the cutting edge such that said drill is formed having a spiral shape.

* * * * *